3,484,816
ELECTROMAGNETIC CLUTCH WITH MEANS TO ACCOMMODATE UNEVEN WEAR ACROSS CLUTCH DISCS

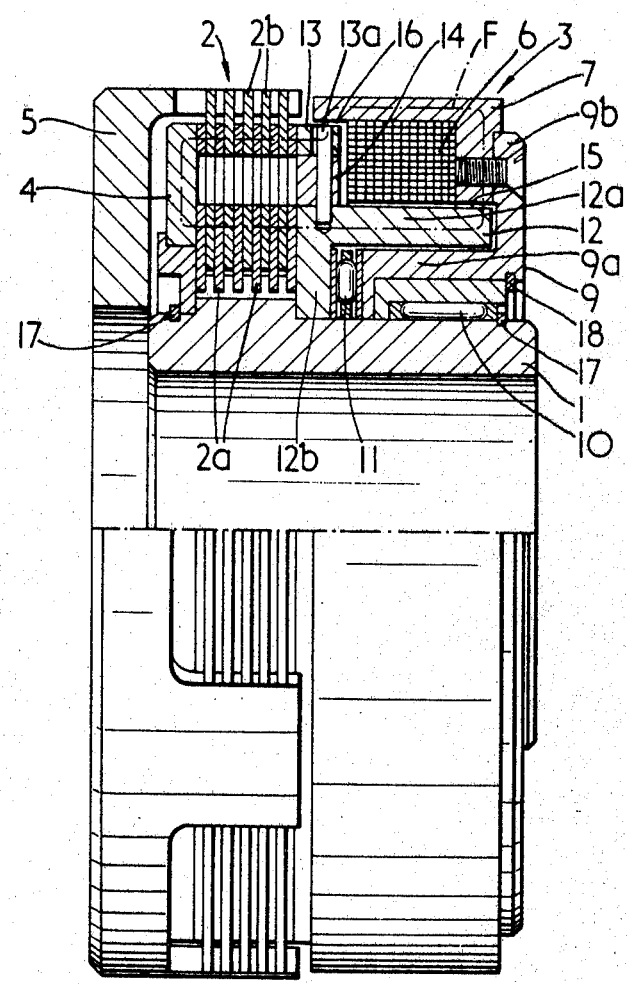

John Bruce Davidson, Brechin, Angus, Scotland, assignor to Coventry Gauge & Tool Company Limited, Coventry, England, a British company
Filed Feb. 26, 1968, Ser. No. 708,148
Claims priority, application Great Britain, Feb. 28, 1967, 9,422/67
Int. Cl. F16d 27/02
U.S. Cl. 192—84                3 Claims

ABSTRACT OF THE DISCLOSURE

An electromagnetically operated clutch in which the assembly of clutch elements, such as a multi disc pack, is operated by an annular electromagnetic coil assembly about the clutch hub through a pole arrangement comprising an inner annular pole member rotatable about the clutch hub and in direct contact with the assembly of clutch elements, and an outer annular pole element spaced about and supported from the inner pole member and carried for axial floating movement relative thereto for direct contact with the clutch element assembly to accommodate uneven wear of the latter.

---

This invention relates to electro magnetically operated clutches of the type in which an assembly of relatively axially movable co-operating clutch elements (e.g. a friction disc assembly or pack) of magnetic material such as ferrous metal is provided about a hub for effecting a drive between the latter and a further rotary member when the clutch element assembly or disc pack is operated or closed together by electro magnetic means provided about the hub.

The invention is concerned in particular with clutches of the above mentioned type wherein the exciter coil and housing of the electro magnetic means remains stationary in use for which purpose suitable anti-friction bearing means is provided in the mounting of the annular coil assembly about the hub.

The object of this invention is to provide an improved and compact form of electro magnetically operated clutch of the type above referred to wherein an improved magnetic pole arrangement is provided for obtaining greater magnetic efficiency in the operation of the clutch.

In describing a practical embodiment of the invention reference is made to the accompanying drawing which is a part axial plane section of a multi disc friction clutch of the type referred to and incorporating the invention.

Referring to the drawing the clutch consists of a ferrous metal hub 1 for mounting on a shaft and carrying the friction disc pack 2 between the electro magnetic means 3 about the hub 1 and an armature plate or ring 4 movable axially relative to the hub 1.

The discs of the pack 2 are axially movable with counter discs 2a mounted rotationally fast with the hub 1 by splined engagement with the latter in a manner known to those skilled in the art, while the other alternate discs 2b have a dogged engagement with a spider 5 such that the hub 1 and spider 5 can be either clutched together by the action of the disc pack 2 or released thereby for relative rotation.

In accordance with one feature of this invention the exciter coil 6 and housing 7 of the electro magnetic means 3 are carried by an annular element 9 of non-magnetic material having in particular a bush or sleeve portion 9a which substantially screens the coil assembly 6, 7 from the hub 1, also from bearing means such as the radial bearing 10 provided in the mounting of the coil assembly 6, 7 and element 9 from the hub 1 whereby the latter is able to rotate relative to the stationary coil assembly 6, 7 under working conditions. The coil 6 and coil housing 7 are shown mounted from an outwardly directed radial flange 9b of the non-magnetic element 9.

In accordance with a further feature of this invention the core or magnetic inner pole member 12 of the electro magnetic means is mounted on the hub 1 so as to be axially and rotationally fast with the later and in direct contact with the disc pack 2. For this purpose the core member 12 is of annular form having an axially parallel sleeve portion 12a and an inwardly directed radial flange portion 12b fast with the hub 1 and in contact with the disc pack 2, the flange 12b being separated from the non-magnetic element 9 by the thrust bearing 11.

The major sleeve portion 12a of the core 12 extends with clearance between the coil assembly 6, 7 and the sleeve 9a of the non-magnetic element 9 so that it is to a large extent screened by the latter from the hub 1 and bearing 10 with the result that flux losses from the core 12 to the hub 1 are kept to a minimum.

Whereas magnetic flux is able to pass from the radial flange 12b of the core 12 to the hub 1, flux loss in this respect is insignificant because of the contact of the flange 12b with the disc pack 2. If desired the core 12 can be further screened from the hub 1 by providing it with a mounting or flange portion of non-magnetic material.

The core or inner pole member 12 carries concentrically with it an outer pole element 13 of ring form radially spaced from the core 12 by a non-magnetic brush 14 or, if desired small area spokes, so as to reduce flux passage between the core 12 and outer pole element 13 to a minimum. The outer pole element 13 is also in direct contact with the disc pack 2, but is separated by clearance from the coil 6 and coil housing 7.

In order to accommodate uneven wear which tends to take place across the faces of he discs 2a, 2b, of the disc pack 2 from the inner to the outer peripheries thereof, the outer pole element 13 is arranged for some axial floating movement relative to the bush 14 but is rotationally fast with the latter by means of radial pins (one of which is shown at 13a) which are engaged with some clearance by the outer pole element 13 in order to permit axial float of the latter. The bush 14 is axially and rotationally fast with the core or inner pole 12.

In the usual manner of operating a clutch of this type, electric current is fed to the coil 6 through suitable terminal points (not shown) mounted on the coil housing 7 and on energizing the coil 6 in this way, the magnetic flux created thereby follows the path indicated at F and which permeates the disc pack 2 and draws the armature plate 4 in a direction for compressing or closing the disc pack 2 between it and the axially fixed assembly of the core 12 and outer pole element 13 for enabling a drive to be effected between the hub 1 and spider 5.

In obtaining the path or circuit of magnetic flux as indicated at F the coil housing 7 serves as a flux carrier and for this purpose small clearance radial air gaps 15, 16 are respectively provided between the housing 7 and sleeve portion 12a of the core 12 and between the housing 7 and outer pole element 13. Such small clearance gaps 15, 16 afford a minimum of interruption to the flux path F yet together with the other clearance shown enable the core 12 and outer pole element 13 to rotate relative to the coil 6 and housing 7.

When coil 6 is de-energized, the inherent resilience of the discs 2a, 2b e.g. due to dishing or wave form of the latter, or the provision of separator springs (not shown), causes their separation or reduced frictional engagement thus de-clutching the drive between the hub 1 and the spider 5.

Circlips 17 retain the complete clutch assembly and electromagnetic operating means in relation to the hub 1 and circlip 18 retains the element 9 relative to the bearing 10.

From the foregoing it will be appreciated that not only is flux loss kept to a minimum but the direct contact of the core 12 and outer pole element 13 with the disc pack 2 provides for greater magnetic efficiency in the operation of the latter.

Whereas operating mechanism according to this invention is particularly suited for use in multi disc friction clutches as herein described, it is also capable of use in a similar manner in clutches of the type referred to in which other suitable co-operating clutch friction elements are employed in place of a disc pack or in which positively engaging or dog clutch elements are employed.

I claim:

1. A clutch of the electromagnetic type, comprising; a hub, a rotary member, an assembly of relatively axially movable cooperating clutch elements mounted around said hub for effecting a drive between said hub and said rotary member, a non-rotatable annular electromagnetic coil assembly mounted by bearings to said hub for operating said clutch element assembly, an annular inner pole member rotatable with the hub relative to the coil assembly and in direct contact with said clutch element assembly, and an annular outer pole element supported in radially spaced axially floating relationship to said inner pole member for direct contact with said clutch element assembly.

2. A clutch according to claim 1 further comprising an annular non-magnetic member mounted between said coil assembly and said bearings for screening said coil assembly from said bearings and said hub to prevent magnetic flux losses.

3. A clutch according to claim 2 wherein said annular inner pole member extends axially and with a clearance between said annular coil assembly and said non-magnetic annular screening member.

References Cited

UNITED STATES PATENTS 2,899,037    8/1959    Pierce.

FOREIGN PATENTS 1,134,433    12/1956    France.

MARK M. NEWMAN, Primary Examiner

A. D. HERRMANN, Assistant Examiner